United States Patent
Cave

(10) Patent No.: US 7,922,389 B2
(45) Date of Patent: *Apr. 12, 2011

(54) SUBSTRATE BASED ON TEMPERATURE SENSING

(75) Inventor: David L Cave, Tempe, AZ (US)

(73) Assignee: Dolpan Audio, LLC, Dover, DE (US)

(*) Notice: Subject to any disclaimer, the term of this patent is extended or adjusted under 35 U.S.C. 154(b) by 16 days.

This patent is subject to a terminal disclaimer.

(21) Appl. No.: 12/420,782

(22) Filed: Apr. 8, 2009

(65) Prior Publication Data

US 2009/0190628 A1    Jul. 30, 2009

Related U.S. Application Data

(60) Continuation of application No. 11/796,600, filed on Apr. 27, 2007, now Pat. No. 7,527,427, which is a division of application No. 11/096,701, filed on Mar. 31, 2005, now Pat. No. 7,237,951.

(51) Int. Cl.
G01K 7/01 (2006.01)
H01L 31/00 (2006.01)

(52) U.S. Cl. .............................. 374/178; 327/513
(58) Field of Classification Search .......... 374/178; 327/513

See application file for complete search history.

(56) References Cited

U.S. PATENT DOCUMENTS

| | | | |
|---|---|---|---|
| 3,851,241 A | 11/1974 | Wheatley | |
| 5,195,827 A * | 3/1993 | Audy et al. | 374/172 |
| 5,933,045 A * | 8/1999 | Audy et al. | 327/513 |
| 6,019,508 A | 2/2000 | Lien | |
| 6,097,239 A | 8/2000 | Miranda et al. | |
| 6,957,910 B1 | 10/2005 | Wan et al. | |
| 7,010,440 B1 | 3/2006 | Lillis et al. | |
| 7,333,038 B1 * | 2/2008 | Aslan | 341/120 |
| 2007/0237207 A1 | 10/2007 | Aslan et al. | |

* cited by examiner

*Primary Examiner* — Lisa M Caputo
*Assistant Examiner* — Mirellys Jagan
(74) *Attorney, Agent, or Firm* — Knobbes Martens Olson & Bear LLP

(57) ABSTRACT

A method for providing accurate temperature sensing of a substrate utilizing the PN junction of a transistor formed on the substrate is described.

18 Claims, 1 Drawing Sheet

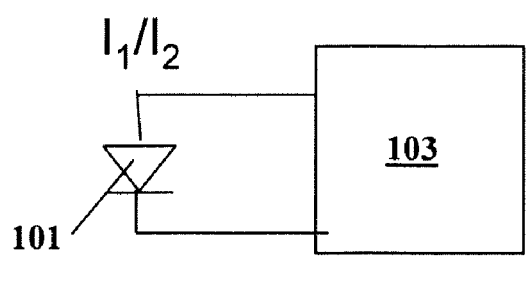
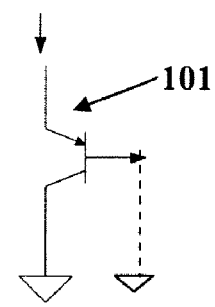
Fig. 1          Fig. 2
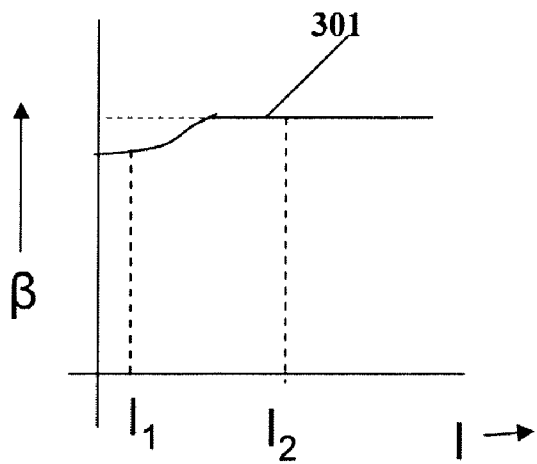
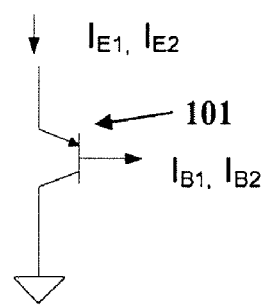
Fig. 3          Fig. 4
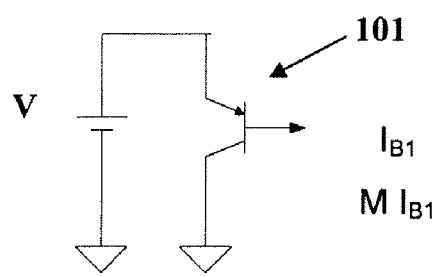
Fig. 5

SUBSTRATE BASED ON TEMPERATURE SENSING

CROSS-REFERENCE TO RELATED APPLICATIONS

This application is a continuation of U.S. application Ser. No. 11/796,600, filed Apr. 27, 2007, which is a divisional of U.S. application Ser. No. 11/096,701, filed Mar. 31, 2005, now U.S. Pat. No. 7,237,951.

BACKGROUND OF THE INVENTION

1. Field of the Invention

This invention pertains to a temperature sensing apparatus, in general, and to an easily calibrated temperature sensing apparatus, in particular.

2. Description of the Related Art

A typical approach to measuring temperatures is to utilize a PN diode junction as a temperature sensor. In integrated circuit applications, the PN junction is typically provided by using a bipolar transistor integrated into the substrate.

In investigating the properties of PN junction temperature sensors, I have determined that certain inaccuracies result from the standard methodology utilized to sense temperatures of substrates of microprocessors.

SUMMARY OF THE INVENTION

In accordance with the principles of the invention, an improved method of determining the temperature of substrates is provided.

In accordance with the principles of the invention two methods of providing improved and more accurate temperature sensing are provided.

In a first methodology in accordance with the principles of the invention, non constant $\beta$ characteristics of a sensing transistor are compensated in the current provided to the transistor emitter.

In a second methodology in accordance with the principles of the invention, the transistor base current is utilized to determine the temperature of the PN junction.

BRIEF DESCRIPTION OF THE DRAWINGS

The invention will be better understood from a reading of the following detailed description of illustrative embodiments of the invention in which like reference indicator are utilized to identify like elements, and in which:

FIG. 1 illustrates a temperature sensing configuration to which the invention may be advantageously applied;

FIG. 2 illustrates a temperature sensing transistor;

FIG. 3 illustrates the characteristic curve of a PNP transistor's $\beta$ characteristic;

FIG. 4 illustrates a sensing transistor operated in accordance with one principle of the invention; and FIG. 5 illustrates a sensing transistor operated in accordance with another principle of the invention.

DETAILED DESCRIPTION

FIG. 1 illustrates a typical temperature sensing configuration utilized as part of a temperature sensing and controlling arrangement for use with highly integrated devices such as microprocessors. The configuration includes a PN junction 101 that is subjected to two current levels $I_1$ and $I_2$, by a temperature sensing and control circuit 103.

As shown in FIG. 2, PN junction 101 typically comprises a bipolar transistor. The bipolar transistor is known to give a transfer equation of $$V_{be} = \eta KT/q \ln I_c/I_o$$

Using this knowledge it is possible to determine the temperature of a transistor by driving it with two different currents whose ratio is M. In so doing, the difference in $V_{be}$ between current $I_{c1}$ and $I_{c2}$ is:

$$\Delta V_{be} = \eta KT/q \ln M,$$

where $\eta$ (emission coefficient), K (Boltzmann's Constant), q (electron charge), and ln M are all constants. Thus T (in Kelvin) is directly proportional to $\Delta V_{be}$.

In many circuits, however, the standard bipolar transistor available is a substrate PNP (P source/drain, N well, P substrate), thus we are unable to drive or control the collector current as the collector is tied via the silicon substrate to circuit ground.

Since only the emitter and base terminals are available, the current industry standard practice is to drive the emitter with currents $I_{E1}$ and $I_{E2}$ whose ratio is M.

If $\beta_1 I_{E1} = \beta_2 I_{E2}$ then the collector ratio is also M and temperature is easily determined.

In high performance CMOS processes it is unlikely that $\beta_1 = \beta_2$, further in these processes $\beta$ is typically very low (0.5-2.0). This is shown in the graph of FIG. 3 by curve 301. In this case $I_{E1}/I_{E2} \neq I_{C1}/I_{C2}$ The problem is indicated if the equation for $\Delta V_{be}$ is modified to read:

$$\Delta V_{be} = \eta KT/q \ln [I_{E2}(\beta_1+1)\beta_2]/[I_{E1}(\beta_2+1)\beta_1]$$

If for example $\beta_1 = 0.7$ and $\beta_2 = 0.8$ we may record an error of 10° C. when using the industry approach of driving the emitter. This error is not tolerable when system requirements are errors of 1° C. or less.

In accordance with a first method to correct for this error, beta correction is utilized.

We wish to control $I_{C2}/I_{C1} = M$ thus, $M = (I_{E2} - I_{B2})/(I_{E1} - I_{B1})$ and we can show $$I_{E2} = MI_{E1} + (I_{B2} - MI_{B1})$$

If $\beta_1 = \beta_2$ the second term goes to zero and we drive $I_{E2}/I_{E1} = M$. However, for instances in which $\beta_1 \neq \beta_2$ we modify the current drive to satisfy the above equation.

In accordance with the principles of the invention, a method and circuit implementation to achieve the above equation is as follows:

1. Drive $I_{E1}$ and record $I_{B1}$, $V_{be1}$ and create $MI_{B1}$
2. Drive $MI_{E1}$ and record $I_{B2}$
3. Add $I_{B2} - MI_{B1}$ current to $MI_{E1}$
4. Record $V_{be2}$
5. $\Delta Vbe = V_{be2} - V_{be1}$
6. Compute temperature This arrangement of transistor 101 is shown in FIG. 4.

In accordance with the principles of the invention, the base drive may be utilized. It is a little known and/or used fact that base current also follow an exponential equation $$V_{be} = \eta KT/q \ln I_B/I_o \text{ and thus, } \Delta V_{be} = \eta KT/q \ln I_{B2}/I_{B1}$$

In accordance with this equation, accurate temperatures may be recorded by referencing the emitter of transistor 101 to a common voltage V and current driving the base with current $I_{B1}$ and $I_{B2}$ such that $I_{B2}/I_{B1} = M$ as shown in FIG. 5.

The invention has been described in terms of illustrative embodiments of the invention. It will be apparent to those skilled in the art that various changes may be made without departing from the spirit of scope of the invention. It is not intended that the invention be limited by the embodiments disclosed and described.

What is claimed is:

1. An arrangement for measuring the temperature of a substrate, the arrangement comprising:
    a sensing transistor on the substrate; and
    a sensing and control circuit coupled to the sensing transistor, wherein the sensing and control circuit is configured to:
    provide a voltage to the emitter of the sensing transistor;
    current drive the base of the sensing transistor with a first current $I_{B1}$;
    measure a first base emitter voltage $V_{be1}$;
    current drive the base of the sensing transistor with a second current $I_{B2}$ such that $I_{B2}/I_{B1}$ equals a constant M;
    measure a second base emitter voltage $V_{be2}$; and
    determine the temperature T of the substrate using the relationship $\Delta V_{be} = \eta KT/q \ln I_{B2}/I_{B1}$, where $\Delta V_{be} = V_{be2} - V_{be1}$, K is Boltzmann's Constant, and emission coefficient $\eta$ and electron charge q are constants.

2. The arrangement of claim 1, wherein the sensing transistor comprises a bipolar transistor.

3. The arrangement of claim 1, wherein the sensing transistor has a first current gain $\beta_1$ corresponding to the first base current $I_{B1}$ and a second current gain $\beta_2$ corresponding to the second base current $I_{B2}$.

4. The arrangement of claim 3, wherein $\beta_1$ does not equal $\beta_2$.

5. A method of sensing the temperature of a substrate having a sensing transistor formed therein, the method comprising:
    current driving the base of the sensing transistor with a first current;
    measuring a base emitter voltage first response to the first current;
    current driving the base of the sensing transistor with a second current, wherein the second current has a predetermined relationship with the first current;
    measuring a base emitter voltage second response to the second current; and
    determining the temperature of the substrate, wherein the only measurements said determining uses are the first and second responses.

6. The method of claim 5, wherein said method comprises using a PN junction of the sensing transistor.

7. The method of claim 5, wherein the predetermined relationship between the first current $I_{B1}$ and the second current $I_{B2}$ is $I_{B1} = I_{B2}/M$, where M is a constant.

8. The method of claim 7, wherein said determining the temperature T of the substrate uses the relationship $\Delta V_{be} = \eta KT/q \ln I_{B2}/I_{B1}$, where K is Boltzmann's Constant, emission coefficient $\eta$ and electron charge q are constants, and $\Delta V_{be}$ equals the second response $V_{be2}$ minus the first response $V_{be1}$.

9. An arrangement for measuring the temperature of a substrate, the arrangement comprising:
    a substrate having a sensing transistor formed therein; and
    a sensing and control circuit configured to operate the sensing transistor by current driving the base of the sensing transistor with a first current, measuring a base emitter voltage first response to the first current, current driving the base of the sensing transistor with a second current, and measuring a base emitter voltage second response to the second current, wherein the second current has a predetermined relationship with the first current, and wherein the sensing and control circuit is further configured to determine the temperature of the substrate using the first and second responses.

10. The arrangement of claim 9, wherein the sensing transistor comprises a bipolar transistor.

11. The arrangement of claim 9, wherein the sensing transistor comprises a PN junction.

12. The arrangement of claim 9, wherein the sensing transistor comprises a collector tied to ground.

13. The arrangement of claim 9, wherein the sensing transistor comprises an emitter referenced to a common voltage V.

14. The arrangement of claim 9, wherein the sensing transistor is integrated into a microprocessor.

15. The arrangement of claim 9, wherein the predetermined relationship between the first current $I_{B1}$ and the second current $I_{B2}$ is $I_{B1} = I_{B2}/M$.

16. The arrangement of claim 15, wherein the temperature T of the substrate is configured to be determined using the relationship $\Delta V_{be} = \eta KT/q \ln I_{B2}/I_{B1}$, where K is Boltzmann's Constant, emission coefficient $\eta$ and electron charge q are constants, and $\Delta V_{be}$ equals the second response $V_{be2}$ minus the first response $V_{be1}$.

17. The arrangement of claim 9, wherein the sensing transistor has a first current gain $\beta_1$ corresponding to the first base current $I_{B1}$ and a second current gain $\beta_2$ corresponding to the second base current $I_{B2}$.

18. The arrangement of claim 17, wherein $\beta_1$ does not equal $\beta_2$.

* * * * *

UNITED STATES PATENT AND TRADEMARK OFFICE
CERTIFICATE OF CORRECTION

| | | |
|---|---|---|
| PATENT NO. | : 7,922,389 B2 | Page 1 of 1 |
| APPLICATION NO. | : 12/420782 | |
| DATED | : April 12, 2011 | |
| INVENTOR(S) | : Cave | |

It is certified that error appears in the above-identified patent and that said Letters Patent is hereby corrected as shown below:

Title page, item (74), under "Attorney, Agent, or Firm", in Column 2, Line 1, delete "Knobbes" and insert -- Knobbe --.

Signed and Sealed this
Thirteenth Day of September, 2011

David J. Kappos
*Director of the United States Patent and Trademark Office*